United States Patent
Tabel

[19]

[11] Patent Number: 5,889,479
[45] Date of Patent: Mar. 30, 1999

[54] APPARATUS FOR GUIDING THE PILOT OF AN AIRCRAFT APPROACHING ITS PARKING POSITION

[75] Inventor: Ernst Otto Tabel, Hamburg, Germany

[73] Assignee: Johann Hipp, Hamburg, Germany

[21] Appl. No.: 702,524

[22] PCT Filed: Feb. 23, 1995

[86] PCT No.: PCT/EP95/00661

§ 371 Date: Aug. 30, 1996

§ 102(e) Date: Aug. 30, 1996

[87] PCT Pub. No.: WO95/23734

PCT Pub. Date: Sep. 8, 1995

[30] Foreign Application Priority Data

Mar. 2, 1994 [DE] Germany ............................. 44 06 821

[51] Int. Cl.⁶ ............................................... G08B 21/00
[52] U.S. Cl. ............................................ 340/958; 359/172
[58] Field of Search ................................. 340/958, 928; 348/117; 356/3.01, 3.14, 141.2; 250/559.3; 342/23; 244/114 R; 359/172

[56] References Cited

U.S. PATENT DOCUMENTS

| | | | |
|---|---|---|---|
| 3,729,262 | 4/1973 | Snead et al. | 340/958 |
| 4,015,235 | 3/1977 | Demaine et al. | 340/958 |
| 4,158,885 | 6/1979 | Neuberger | 364/460 |
| 4,994,681 | 2/1991 | Mann | 340/958 |
| 5,166,746 | 11/1992 | Sato et al. | 340/958 |
| 5,646,761 | 7/1997 | Medved et al. | 359/172 |

OTHER PUBLICATIONS

Patent Abstracts of Japan No. JP2216393, Sato Tetsuo et al, Aircraft Docking Guidance Device, Pub–Aug. 29, 1990.
Patent Abstracts of Japan No. JP4089519, Onari Yasuke et al, Monitoring And Guiding Method For Parking Of Moving Plane, Pub.Mar. 23, 1992.

Primary Examiner—Thomas J. Mullen, Jr.
Assistant Examiner—John Tweel, Jr.
Attorney, Agent, or Firm—Walter C. Farley

[57] ABSTRACT

An apparatus for guiding the pilot of an aircraft approaching its stipulated parking position in a straight line with a distance measuring device, which looks at the aircraft from the front in the direction of movement and which determines the actual position of the aircraft, and with an indicating device, which tells the pilot the distance remaining between the actual and parking positions, is characterised in that at least a 2D laser sensor is provided as the distance measuring device which surveys the front of an aircraft point by point in a (not horizontal) plane within a predetermined viewing angle and in successive measuring sweeps and which resolves each measuring point into its horizontal and vertical coordinates and from the horizontal coordinates, determined in a measuring sweep, of such measuring points, the vertical coordinates of which fall within at least one height range which is separately definable between the threshold values for each aircraft type, forms the average value as the actual position of the aircraft and compares it with the parking position which is also defined as a horizontal coordinate and produces a signal for the indicating device in dependence on the distance between the actual position and the parking position.

7 Claims, 1 Drawing Sheet

APPARATUS FOR GUIDING THE PILOT OF AN AIRCRAFT APPROACHING ITS PARKING POSITION

FIELD OF THE INVENTION

The invention relates to an apparatus for guiding the pilot of an aircraft to a predetermined parking location using a distance measuring device and means for determining the difference between the actual location of the aircraft and its designated parking location.

BACKGROUND OF THE INVENTION

A landed aircraft is in most cases guided firstly into the runway region, in which its parking position is situated, by a vehicle driving in front of it. Painted onto the runway region are so-called center-lines which the aircraft must follow. The center-lines terminate in straight stand-center lines which lead to the parking location.

In appropriately equipped airports, the aircraft dock in the parking position with at least one of their exits at e.g. a gangway bridge. Since such gangway bridges are only movable to a limited extent, it is necessary that the parking position, which is differently determined for each type of aircraft, is adopted exactly. For this purpose, the pilot must stop the aircraft, which is guided on the stand line, at a defined point.

The problem associated with this is that the pilot is located at least 4–6 m above the earth, at least with current aircraft types, and has no direct view downwards.

A range of current accessory equipment (e.g. Moiree indicators) exists which makes it possible for the pilot to guide his aircraft on the stand line without direct visual contact.

The situation is different in connection with systems which are able to give the pilot information relating to the remaining taxiing distance to the parking position. No optimal device has been known up to now in this connection.

It is known e.g. to install induction loops in the ground of the runway which, e.g. as soon as the front wheel of the aircraft rolls over them, produce a signal which can be converted into a corresponding indication of distance. It is disadvantageous that the induction loops can easily suffer damage as a consequence of the large loading by the aircraft which taxi over them or caused by storms, e.g. by lightning strikes, and must be frequently replaced and furthermore also do not function precisely.

A system is also known from WO 90/13104 in which an aircraft approaching its parking position is surveyed by means of radar. This generally occurs with a radar beam based on microwaves which is directed towards the nose of the aircraft. The pilot can find out his actual position or the distance remaining to the parking position by means of an indicator board. It is disadvantageous that the radar beam must be guided to follow the aircraft as it approaches which requires either an optical or some other form of control.

SUMMARY OF THE INVENTION

Against this background, it is the object of the invention to provide an apparatus with which nearly all types of aircraft may be guided reliably and with low data processing effort into the desired parking position and with which no health risk to the cockpit crew can occur, when it is used.

This object is achieved with an having at least one two dimensional (2D) laser sensor directed onto the approaching aircraft from the front. The sensor used in accordance with the invention emits laser pulses with a predetermined frequency and over a viewing angle which is also predetermined, which pulses are reflected back e.g. from the surface of the aircraft into a receiver disposed e.g. in the region of the sensor. The distance of the measuring point from the sensor are calculated from the pulse travel time. If the angle of the emitted laser pulse is also taken into account, the polar coordinates of the measurement point in question can be calculated.

The approaching aircraft front is now surveyed continuously in one plane by means of such a sensor in successive measuring sweeps. The laser sensor should be so directed that the measuring plane extends through the longitudinal axis of the aircraft. The measuring plane can otherwise extend at nearly any desired angle. Having regard to the processing of the measurement results, which will be described below, the measurement plane may, however, not be directed horizontally.

As described above, in each measuring sweep the laser sensor supplies the polar coordinates associated with the points surveyed by it on the front of the aircraft. It is now provided in accordance with the invention that these polar coordinates are converted into a vertical and a horizontal coordinate. After the conversion, the measurement points are determined which fall within a previously determined height range between an upper and a lower vertical coordinate. The measurement points determined for this defined height range are averaged with respect to their horizontal coordinates and the average value used as the basis for the actual position of the aircraft.

The parking position of the aircraft which is to be reached is also defined in terms of a horizontal coordinate specific to each type of aircraft. The approach of the average value described above to the horizontal coordinate of the parking position can be indicated optically or acoustically in a suitable manner.

An important feature of the invention is that the data used to determine the actual position originate only from the measurement results over e.g. a relatively small height range of the front of the aircraft. This height range is separately defined for each type of aircraft and stored in the sensor or the sensor computer. In practice, this operates so that the sensor computer calls up the height range stored for this type of aircraft in its data store on the approach of e.g. an Airbus A 300 and uses it as the basis in the processing of the measurement results.

It has been found that at least one height range may be determined for each of the types of aircraft which have so far been examined in which an unimpeded laser scanning is possible.

The operation of the apparatus in accordance with the invention does, however, presuppose that the sensor can recognise the approaching aircraft type or that the approaching aircraft type is known to the sensor computer in order to be able to call up the height range predetermined for this type of aircraft and the horizontal coordinate of the parking position specific to this type of aircraft. It is assumed that in conventional airports devices, such as that in accordance with the invention, are connected to the central computer of the airport. The central computer knows before an aircraft lands what type of aircraft is involved and at which gate it is to dock. The transmission of this information to e.g. the sensor computer of the gate in question represents absolutely no problem. The commencement of operation of the sensor can of course also be effected other than centrally, e.g. by the gate personnel. It is furthermore also possible that the sensor automatically recognises the approaching aircraft type. This will be discussed below.

The apparatus in accordance with the invention has a whole series of advantages. The main advantage is that nearly all different known aircraft types can be surveyed with one sensor without substantial adaptation. The laser sensor in accordance with the invention can sweep over e.g. a viewing angle of ca.60°. It is arranged at a sufficient distance from the parking position and with an appropriately aligned measuring plane so that with e.g. a viewing angle of 60° not only an approaching sporting plane but also e.g. a jumbo jet can be detected without a height adjustment of the sensor etc. being necessary for this purpose. A further advantage is that the limitation of the analysis to signals which originate from measurement points from at least one (different for each type of aircraft) limited height range requires a smaller data processing effort. It has additionally transpired that the analysis in accordance with the invention produces extremely reliable results. When considering the entire front of the aircraft, one would have to also survey and analyse poorly reflective problematic regions, such as the cockpit window or the aircraft nose which would potentially lead to corruption of the result. This disadvantage is circumvented in accordance with the invention by analysing only the measurement signals which originate from measurement points on previously selected, good reflective regions of the front of the aircraft. There is a multiplicity of such regions on the front of each aircraft between the nose and cockpit window.

One or a plurality of height ranges may be defined for each of the types of aircraft which have been examined up to now in which disturbance-free laser scanning is possible. If a plurality of height ranges is available for analysis for each measuring sweep, the reliability of the measurement increases. It can be provided in this connection that of the plurality of predetermined height ranges only those are used in the analysis which are highly reflective and supply measurement signals of sufficient strength. It is to be assumed that the front regions of aircraft of the same type are not necessarily the same as regards their reflective properties. Serious discrepancies can occur within one type as a consequence of different decoration dependent on the airline or as a consequence of dirt. If a plurality of height ranges for analysis are available for each type of aircraft, the height range or ranges, which are used as the basis of the determination of the actual position of the aircraft, can be individually selected for each approaching aircraft of one type in dependence on the quality of the measured signal.

A prerequisite for the functioning of the invention is that the sensor or the sensor computer has stored one or more height ranges for each type of aircraft and the corresponding parking positions. The input of the height ranges and the parking positions into the sensor store means a relatively large amount of work in view of the large number of different aircraft types etc. An advantageous embodiment therefore provides that the apparatus in accordance with the invention automatically detects and stores the data relevant to the aircraft type in question (height regions to be analysed, parking position). For this purpose, an aircraft of a new (not yet "known" to the sensor) aircraft type is lined up in the parking position in front of the sensor. The sensor then scans over the front of the aircraft in predetermined height ranges and selects at least one good reflective height range. This height range is stored for this type of aircraft and used as the basis in future when determining the actual position of all aircraft of this type. Furthermore, the average value calculated for this height range during the calibration is store d as the parking position for the aircraft type. This embodiment has a number of advantages at the same time. The apparatus need not be expensively programmed. Furthermore, the height ranges which permit optimum scanning are not theoretically defined but determined in an actual measuring situation.

The invention also presupposes that the sensor knows what type of aircraft is approaching. As stated above, it is no problem in modern airports to transmit such information to the sensor. That is to say, the sensor of the gate in question can e.g. be informed e.g. by the central computer of the airport (or by the gate personnel by means of a manual control) which aircraft type is to be guided into the parking position. It can, however, also be desirable if the sensor itself is in the position to recognise the approaching aircraft type, e.g. as a precaution or to check the information transmitted by the airport computer. It can then perform a comparison with the information transmitted by the airport computer and, in the event of a discrepancy, optionally terminate the taxiing process of the aircraft or take over the guiding function with reference to its own data. A further embodiment which is advantageous in this connection, provides that the sensor firstly surveys an approaching aircraft in a plurality of height ranges. The resulting profile is compared with profiles stored in the sensor store for the aircraft types in question and the type of aircraft is determined.

As stated above, the measuring plane of the laser sensor should be aligned in the longitudinal axis of the aircraft to be surveyed and can, apart from this, adopt nearly any desired angle with its other main axis. Due to the selected processing of the measurement results—selection only of the measurement points which fall into a predetermined height range—the measuring plane may, however,not be aligned horizontally (since one would in this case obtain measured values relating to only one height range). The measuring plane of the laser sensor is, however, sensibly so selected that it is substantially vertically aligned. As a result of the vertical alignment of the measuring plane the possibility for errors is reduced and it is ensured on the other hand that the laser sensor can actually detect widely varying types of aircraft without major adaptation. With a laser sensor whose measuring plane is aligned to deviate only slightly from the horizontal on the other hand, a height adjustment of the sensor to different types of aircraft must presumably be performed which is relatively laborious.

It could also e.g. be contemplated integrating the sensor movably, e.g. into a hand device which is operated by a guide waiting in front of the parking position of the aircraft. It is, however, necessary with such a mobile sensor that the position from which measurements are made is also known to the sensor or the computer. Furthermore, it might well be necessary that such a mobile sensor is always held at a defined height. A series of errors could occur in this connection. It is also in any event desired to reduce the work by the personnel at the airport.

A further advantageous embodiment therefore provides that the sensor is disposed on a region of the airport building aligned with the parking position of the aircraft. It is necessary that the sensor is directed towards the approaching front of the aircraft directly from the front. With a fixed installation of the sensor, use must therefore be made of the fact that aircraft do not move freely on the runway but along fixed stand lines into their parking positions. If the sensor is installed on the airport building, care should merely be taken that it is arranged above the stand line or the straight extension thereof.

A final advantageous embodiment provides that a plurality of laser sensors are provided, the measuring planes of which are arranged next to and parallel to one another. Particularly with a vertical orientation of the measuring planes, a possible lateral deviation of the aircraft from the center-line may also be detected and indicated without difficulty.

BRIEF DESCRIPTION OF THE DRAWING

The invention will be described below in more detail with reference to a single FIGURE which is a schematic side elevation of a typical aircraft near an airport building and showing an installation of apparatus in accordance with the invention.

DESCRIPTION OF THE PREFERRED EMBODIMENTS

Figure 1:
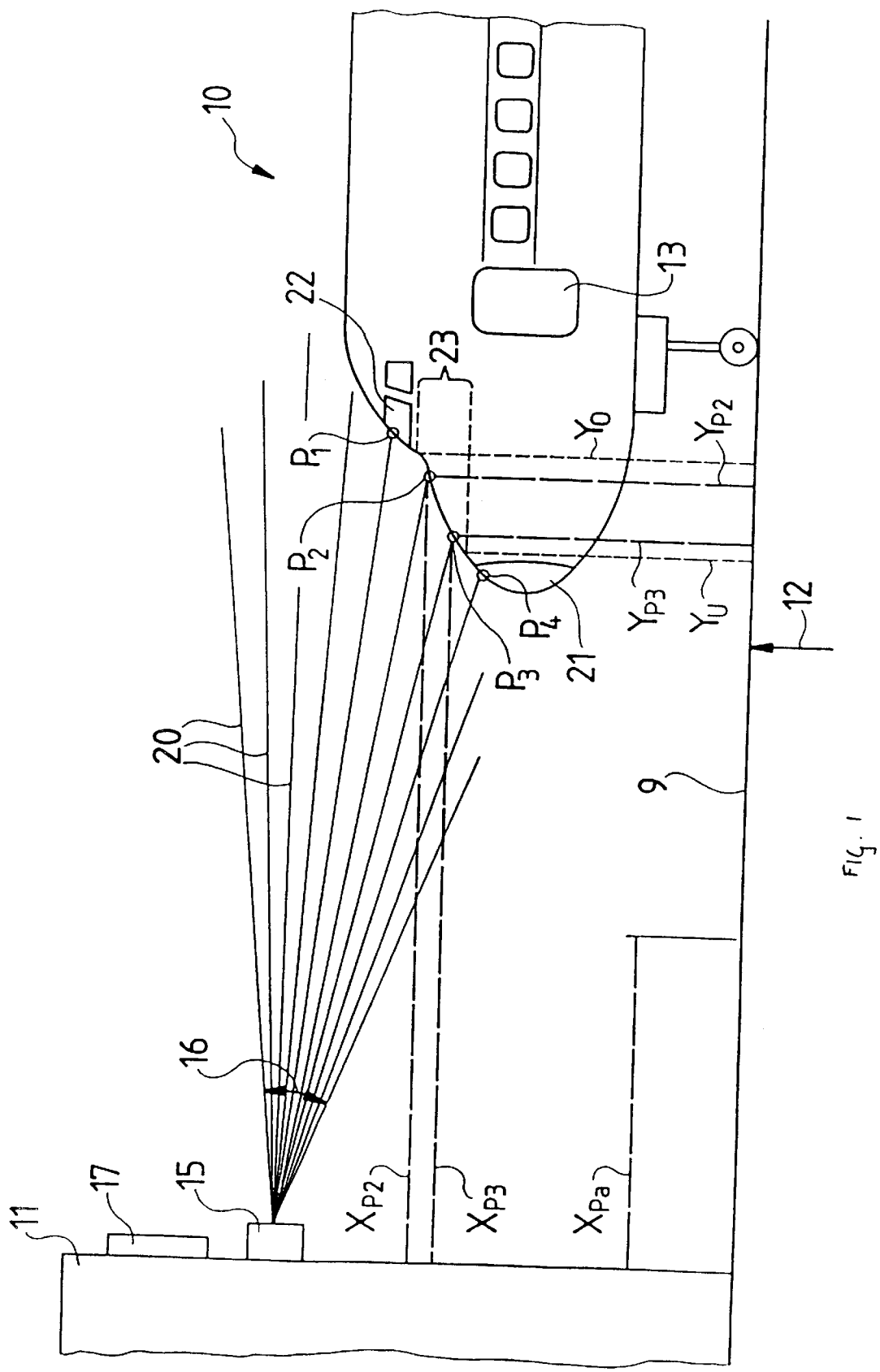

An aircraft 10, which is moving towards an airport building 11, is shown schematically in the drawing on a runway region 9. The parking position provided for the aircraft 10 is designated with an arrow 12. The arrow 12 indicates the docking position of a gangway bridge, which is not shown, with a door 13 of the aircraft 10. The aircraft 10 must thus be situated in the parking position with its cabin door 13 at the position above the runway 9 indicated by the arrow 12. In order to assist the pilot in guiding the aircraft 10 into its parking position, a sensor 15 is provided which scans the front of the aircraft 10 with a laser beam 20, which is pivotable within a viewing area 16, and which impinges on a plurality of measuring points including points P1 to P4 shown by way of example. The mode of operation of the laser sensor has already been explained above. It will not be discussed again here.

When surveying the front of the aircraft 10 by means of the sensor 15, the polar coordinates of all the scanned points are produced. The polar coordinates can then be converted, e.g. for the point P2, into a horizontal coordinate $X_{P2}$ and a vertical coordinate $Y_{P2}$. A height range 23 is also determined which is defined by the vertical coordinates $Y_o$ and $Y_u$. For all the measuring points P2 and P3, which fall within the region bounded by the vertical coordinates $Y_u$ and $Y_o$, the associated horizontal coordinates $X_{P2}$ and $X_{P3}$ are calculated and averaged. The average value produced is defined as the actual position of the aircraft 10. The height range 23 is so selected for each type of aircraft that it reflects the laser beams well, that is to say is not situated at a position on the front which reflects poorly, as is the case with the cockpit window 22 and the radar dome 21 arranged at the nose. This selection of the measuring points to be processed provides reliable results. In case of doubt, even one measuring point in the predetermined height range $Y_u$, $Y_o$ is sufficient in order to ensure an adequate estimate of the position of the aircraft 10.

A value for a horizontal coordinate $X_{Pa}$ for the parking position may be determined and stored in the sensor computer from the known distance between the front of the aircraft and the cabin door 13 (which is specific to each aircraft). If the average value calculated in the successive measuring sweeps from the horizontal coordinates $X_{P2}$ and $X_{P3}$ reaches the value of the horizontal coordinate $X_{Pa}$, then the aircraft 10 is situated with its cabin door in the desired position 12. The continuing approach of the aircraft 10 to its parking position can then be communicated to the pilot in a suitable manner by means of a display 17 mounted in the vicinity of the sensor.

The sensor can be of any desired construction. One will generally use a sensor with a mirror or prism scanner. It is, however, also possible e.g. that the sensor has a series of laser diodes which emit parallel laser pulses. These pulses are differently refracted by a projection lens, depending on the position of the emitting laser diode, and may in each case be associated with a defined angle. If the laser diodes are controlled to switch on successively, the result is also a scanning over a defined angular region. The advantages of the invention may be realised in any case independently of the selection of the sensor used.

I claim:

1. An apparatus for guiding the pilot of an aircraft approaching a predetermined parking location along a straight line, the apparatus comprising the combination of laser transmitter and sensor means for generating a plurality of laser pulses, for receiving reflections of said pulses reflected from a surface of an aircraft fuselage and for determining distance to said surface from elapsed pulse travel time;

means for causing said laser pulses to successively sweep along a plurality of lines lying in a non-horizontal plane and within a predetermined sweep angle;

means for supporting said laser transmitter and sensor means so that said non-horizontal plane intersects a front surface of said fuselage of said aircraft, whereby said transmitted pulses successively survey said front surface of said fuselage at a plurality of points on said fuselage within said sweep angle;

means for resolving horizontal and vertical coordinates of each of said points, for determining horizontal coordinates corresponding to the vertical coordinates of selected ones of said points falling within a selected height range for a predetermined aircraft type, and for forming an average value of said horizontal coordinates for use as an actual location value of the aircraft;

means for storing a predetermined horizontal coordinate as a parking location value for said aircraft, for comparing said actual location value with said stored parking location value, and for producing a signal representative of a difference between said values; and p1 display means for displaying an indication of said difference for use by the pilot in guiding said aircraft toward said parking location.

2. An apparatus according to claim 1 wherein said non-horizontal plane is substantially vertical.

3. An apparatus according to claim 1 wherein said means for resolving defines a plurality of height ranges for each type of aircraft and wherein, in each survey of said fuselage of said aircraft, said selected points are selected from at least one of said height ranges to determine actual aircraft position.

4. An apparatus according to claim 1 wherein said laser transmitter means repeatedly surveys said front surface of said fuselage of said aircraft in a predetermined plurality of height ranges while said aircraft is standing in said parking location, and said means for resolving selects at least one height range as a function of measurement signal quality and stores said selected height range for the type of said aircraft and stores said average value calculated from said measurement points falling in said height range as the parking location.

5. An apparatus according to claim 1 wherein said transmitted laser pulses survey said front surface of said fuselage of an aircraft of unknown type approaching said parking location in a plurality of predetermined height ranges, said means for resolving calculates average values from measuring points within each of said height ranges, and compares said calculated average values with stored average values in height ranges defined for various aircraft types in said means for storing to determine the type of the approaching aircraft.

6. An apparatus according to claim 1 wherein said means for supporting fixedly supports said laser transmitter and sensor means above a stand center line or a straight extension of said line.

7. An apparatus according to claim 1 and including a plurality of laser transmitter and sensor means, and wherein said means for supporting supports said plurality of laser transmitter and sensor means with non-horizontal planes for said plurality of said laser transmitter and sensor means parallel with each other.

\* \* \* \* \*